(12) United States Patent
Idei

(10) Patent No.: US 7,204,285 B2
(45) Date of Patent: Apr. 17, 2007

(54) MOTORCYCLE TIRE

(75) Inventor: Mitsushige Idei, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 10/378,741

(22) Filed: Mar. 5, 2003

(65) Prior Publication Data
US 2003/0173013 A1    Sep. 18, 2003

(30) Foreign Application Priority Data
Mar. 5, 2002    (JP)    ............... 2002-59184

(51) Int. Cl.
B60C 9/08    (2006.01)
B60C 9/22    (2006.01)
B60C 9/20    (2006.01)

(52) U.S. Cl. .................. 152/531; 152/533; 152/534; 152/554

(58) Field of Classification Search ............... 152/531, 152/533, 554, 534
See application file for complete search history.

(56) References Cited
U.S. PATENT DOCUMENTS
4,773,462 A    9/1988    Ohkuni et al.
5,339,878 A    8/1994    Takase
6,286,575 B1 *    9/2001    Nakamura ............... 152/533 X

FOREIGN PATENT DOCUMENTS

| DE | 32 42 323 A1 | 6/1983 |
|---|---|---|
| EP | 0 628 435 A1 | 12/1994 |
| EP | 0 635 383 A1 * | 1/1995 |
| EP | 0 703 102 A2 | 3/1996 |
| EP | 0 928 703 A1 | 7/1999 |
| EP | 1 149 714 A2 | 10/2001 |
| GB | 2 157 239 A | 10/1985 |

* cited by examiner

Primary Examiner—Adrienne C. Johnstone
(74) Attorney, Agent, or Firm—Birch, Stewart, Kolasch & Birch, LLP

(57) ABSTRACT

A radial motorcycle tire comprises a tread portion with a pair of tread edges, a pair of sidewall portions, a pair of bead portions each with a bead core therein, and a band disposed in the tread portion and composed of windings of at least one cord wound at an angle of not more than 5 degrees with respect to the tire equator. The tread portion is provided radially inside the band with at least two layers of cords comprising a radially outermost first layer and a radially inner second layer next to the first layer, wherein with respect to the tire equator, the cords of the first layer are inclined to a direction at an angle of from 65 to 90 degrees, and the cords of the second layer are inclined to the same direction as the first layer at an angle of from 65 to 90 degrees.

1 Claim, 7 Drawing Sheets

FIG.1

| 12A | 11 |
| --- | --- |
| 12B | 11 |
| 12C | 6A |

FIG.2

| | 2-1 | 2-2 | 2-3 |
|---|---|---|---|
| 12A | 11 | 6B | 6b |
| 12B | 6B | 6A | 6b |
| 12C | 6A | 6A | 6A |

FIG.3

|  | 3-1 | 3-2 | 3-3 |
|---|---|---|---|
| 12A | 11 | 11 | 6B |
| 12B | 11 | 6B | 6B |
| 12C | 6B | 6A | 6A |
| 12D | 6A | 6A | 6A |

MOTORCYCLE TIRE

The present invention relates to a pneumatic tire, more particularly to an internal structure of the tread portion being capable of improving cornering performance as well as the absorbability for disturbance from the road surface.

BACKGROUND OF THE INVENTION

In recent years, in order to improve high-speed performance of a radial motorcycle tire, the tread reinforcing belt changes its structure from the conventional two-cross-ply breaker whose cord angles are relatively large to a zero-degree band whose cord angle is almost zero degree with respect to the tire equator.

In comparison with such conventional two-cross-ply breaker, the zero-degree band can provide a larger circumferential restricting force for the tread portion to improve high-speed performance during straight running, and the axial bending rigidity of the tread portion becomes lower to improve the absorbability for disturbance from the road surface. As a result, shimmy of the vehicle body and handlebar vibrations during high speed straight running is effectively controlled to improve high-speed stability and the like. On the other hand, however, when compared with the two-cross-ply breaker, cornering performance has a tendency to deteriorate due to the lower axial bending rigidity.

It may be easily imagined that a zero-degree band and a two-cross-ply breaker are used in combination. In this case, the cornering performance may be improved, but the disturbance absorbability deteriorates. Thus, the disturbance absorbability and cornering performance are in an antinomic relationship.

It is therefore, an object of the present invention to provide a radial motorcycle tire, in which such antinomic requirements, disturbance absorbability and cornering performance are satisfied at the same time.

BRIEF SUMMARY OF THE INVENTION

According to the present invention, a radial motorcycle tire comprises
a pair of sidewall portions,
a pair of bead portions each with a bead core therein,
a band disposed in the tread portion and composed of windings of at least one cord wound at an angle of not more than 5 degrees with respect to the tire equator,
the tread portion provided radially inside the band with at least two layers of cords comprising a radially outermost first layer and a radially inner second layer next to the first layer, wherein with respect to the tire equator, the cords of the first layer are inclined to a direction at an angle of from 65 to 90 degrees, and the cords of the second layer are inclined to the same direction as the first layer at an angle of from 65 to 90 degrees.

Therefore, the camber thrust can be increased while controlling the rising of the cornering force. As a result, disturbance absorbability and cornering performance are improved at the same time. As the cords in the first and second layers are inclined to the same direction, the bending rigidity of the layers is increased in the cord direction relatively to the number of the cord layers, but in the perpendicular direction, the rigidity increase is little. Therefore, in the tread portion, the rigidity balance between the radial direction (right-left direction) and the circumferential direction of the tire is optimized. More specifically, the rigidity increase in the tire circumferential direction is controlled, and good disturbance absorbability originate from the zero-degree band is displayed to improve the vehicle body shimmy, handlebar vibration, high-speed stability and the like. Further, in case of motorcycles, as the camber thrust has a more effect on the cornering performance than the cornering force, the cornering performance is improved by the increased rigidity in the radial direction although the rigidity increase in the circumferential direction is small.

BRIEF DESCRIPTION OF THE DRAWINGS

Embodiments of the present invention will now be described in detail in conjunction with the accompanying drawings.

DETAILED DESCRIPTION OF THE INVENTION

In the drawings, radial motorcycle tire 1 according to the present invention comprises a tread portion 2 with tread edges E1, a pair of sidewall portions 3, a pair of bead portions 4 each with a bead core 5 therein, a carcass 6 extending between the bead portions 4, and a belt structure disposed radially outside the carcass 6 in the tread portion 2.

Figure 4:
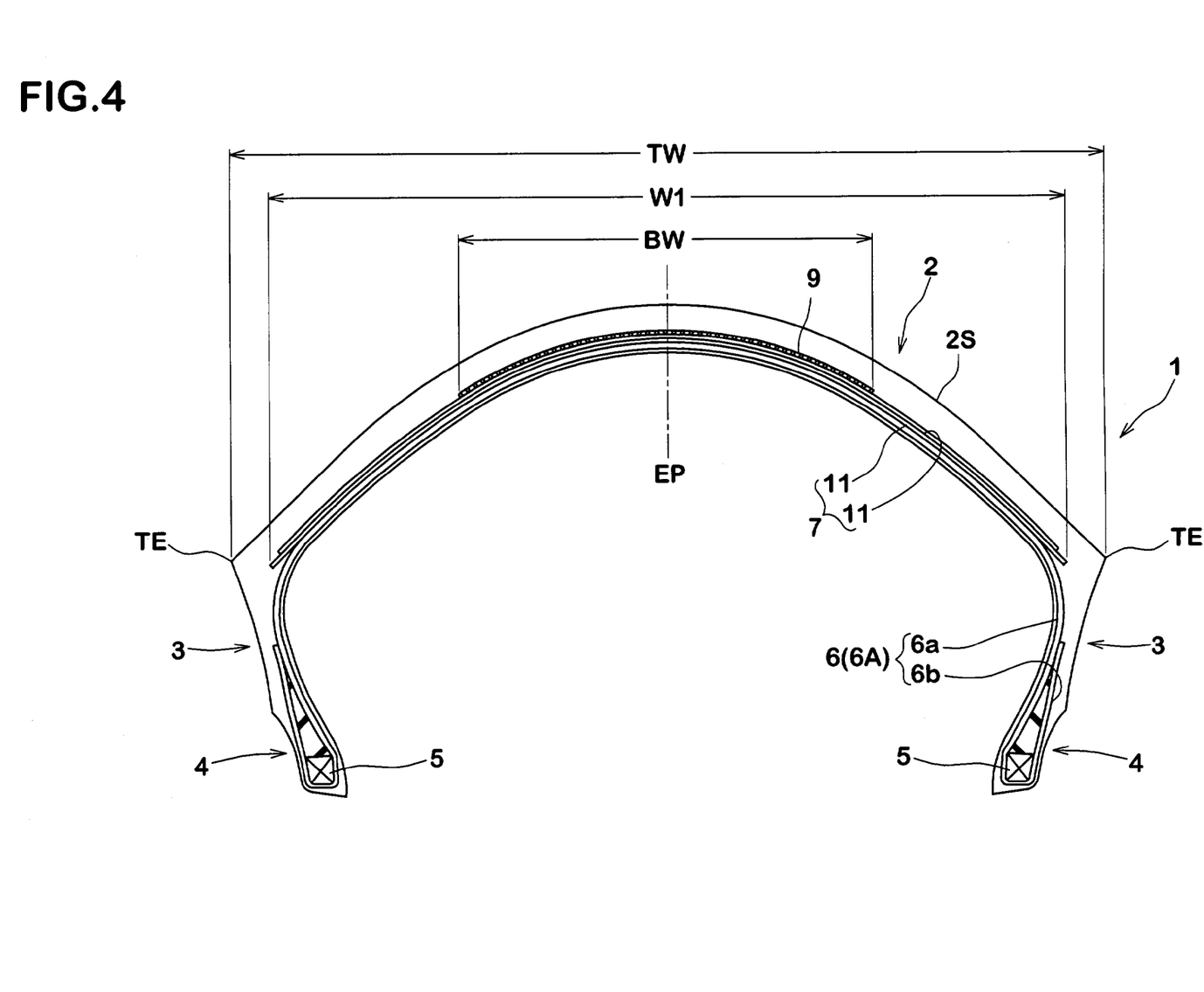
FIG. 4 is a cross sectional view of a motorcycle radial tire according to the present invention showing a combination of a breaker and a carcass.

The tread portion 2 is curved so that the tire maximum width Tw lies between the tread edges E1 as best depicted in FIG. 4.

The carcass 6 is composed of one to three plies 6A, 6B of cords arranged radially at an angle of from 65 to 90 degrees with respect to the tire equator EP.

The carcass 6 includes at least one ply 6A which is extended between the bead portions 4 through the tread portion 2 and sidewall portions 3 and turned up around the bead core 5 in each of the bead portions 4 from the inside to outside of the tire so as to form a pair of turnup portions 6b and a main portion 6a therebetween.

In FIG. 4, the carcass 6 is composed of only the above-mentioned turned-up ply 6A.

Figure 5:
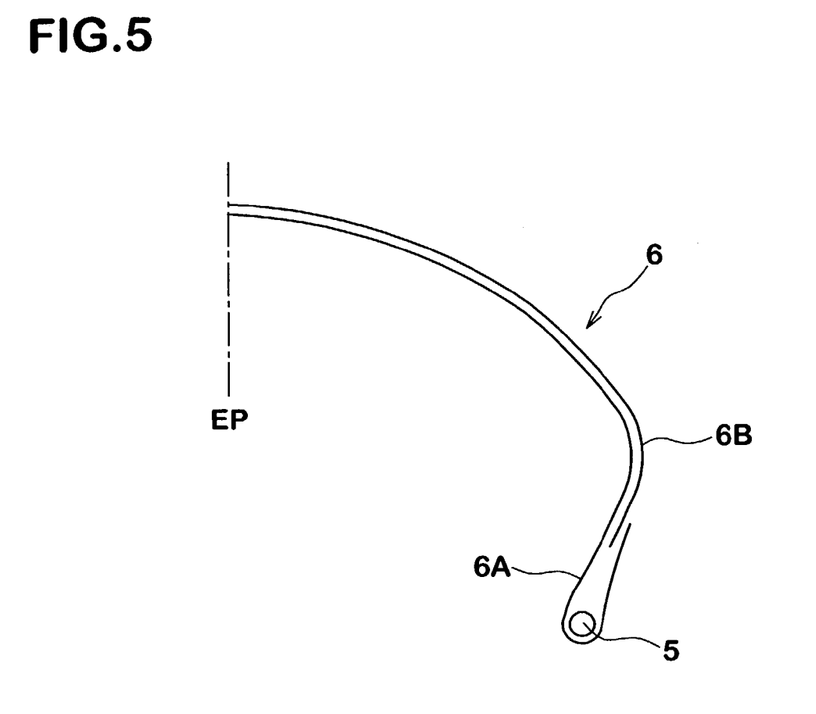
FIG. 5 is a schematic cross sectional view showing another example of the carcass structure which can be used in combination with a breaker.

In FIG. 5 showing another example, the carcass 6 is composed of the turned-up ply 6A and an additional ply 6B which is disposed outside the turned-up ply 6A and extends over the entire width of the tread portion 2 beyond the tread edges TE and terminates in the bead portions 4 or alternatively in the sidewall portions 3 especially lower sidewall portion near the bead portion without being turned up around the bead cores 5.

Figure 6:
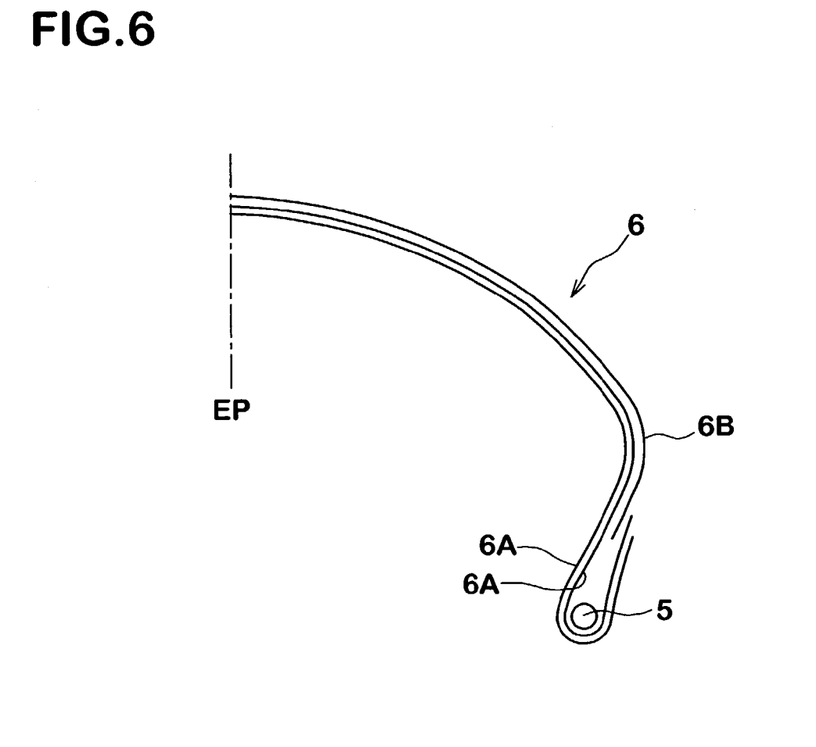
FIG. 6 is a schematic cross sectional view showing still another example of the carcass structure which can be used aloe or in combination with a breaker.

In FIG. 6 showing still another example, the carcass 6 is composed of the two turned-up plies 6A and the additional ply 6B which is disposed outside the outer turned-up ply 6A.

In any case, organic fiber cords, e.g. nylon, polyester, rayon, aromatic polyamide and the like are preferably used as the carcass cords.

The belt structure comprises a band 9 disposed radially outside the carcass 6 and an optional breaker 7 disposed radially inside the band 9 but radially outside the carcass 6.

The band 9 is composed of a single ply of windings of at least one cord wound spirally at an angle of not more than 5 degrees with respect to the tire equator EP. The band 9 is to provide a circumferential restricting force for the tread portion 2 to improve the high-speed durability. Therefore, if the width w2 is less than 0.4 times the tread width TW, it becomes difficult to control the lifting of the tread edge portions during high speed running. If more than 0.7 times, although a further lifting control effect can not be expected, it increases the weight and affect dynamic performance. Accordingly, the width w2 of the band 9 is set in a range of from 0.4 to 0.7 times the tread width Tw.

For the band cords, organic fiber cords, e.g. nylon, polyester, rayon, aromatic polyamide and the like can be suitably used.

The breaker 7 is composed of at least one ply 11 of substantially parallel cords laid at an angle of from 65 to 85 degrees with respect to the tire equator EP.

The breaker ply 11 has a width w1 of from 0.8 to 0.9 times the tread width TW. Therefore, the substantially overall width of the tread portion 2 is reinforced while the axial edges thereof terminate in the tread portion 2.

For the breaker cords, organic fiber cords, e.g. nylon, polyester, rayon, aromatic polyamide and the like can be used.

In order to control rising of the cornering force, the angle of the carcass cords and the angle of the breaker cords are set in a range of not less than 65 degrees with respect to the tire equator EP. Especially, in the light of balance between the handlebar shimmy, disturbance absorbability and cornering performance, the breaker cord angle is preferably set in a range of 72 to 80 degrees with respect to the tire equator EP.

According to the present invention, there are provided with three or four cord layers 12 (12A, 12B, 12C, 12D) in the tread portion 2 excluding the band 9.

Figure 1:
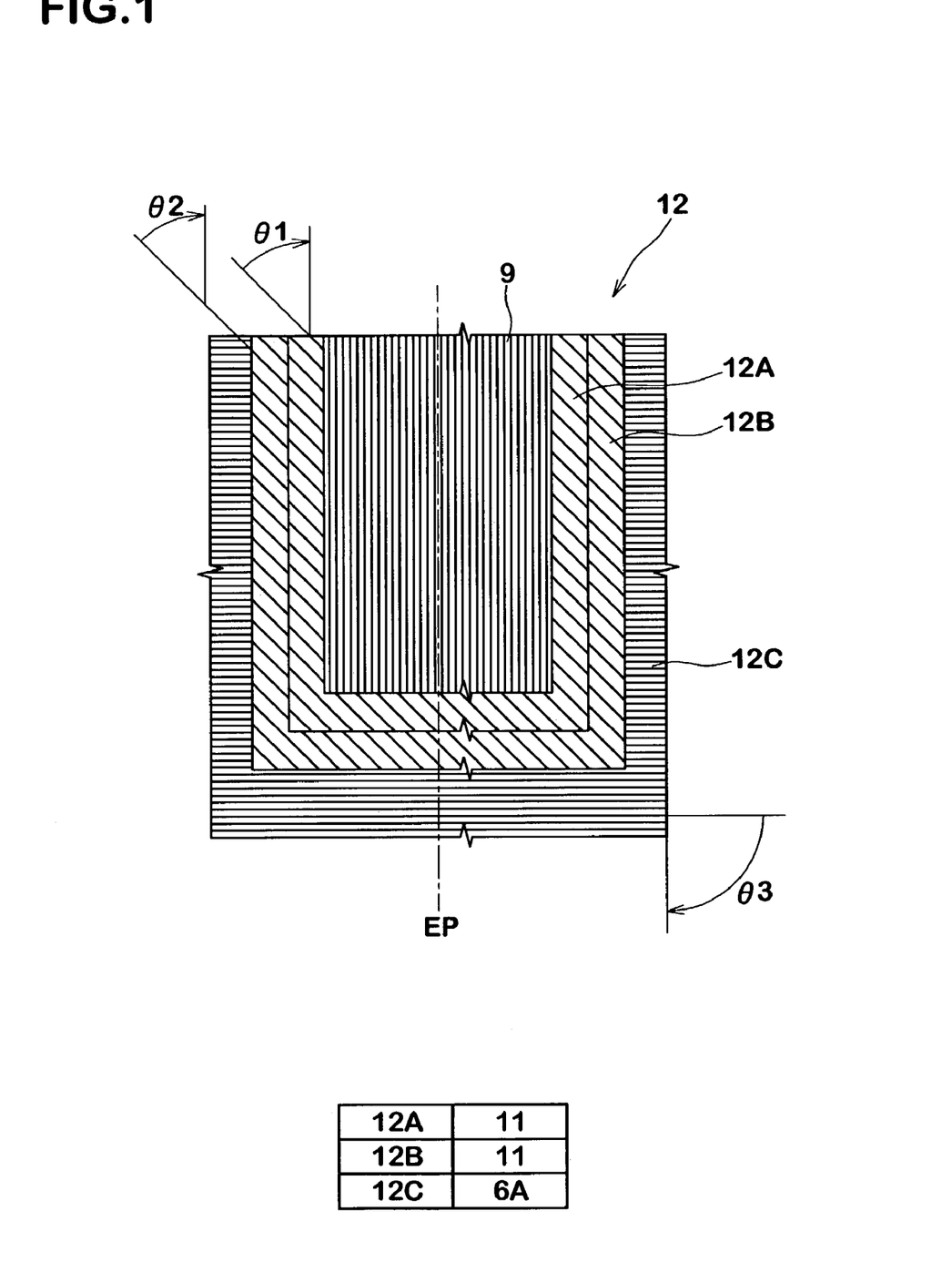
FIG. 1 is a developed view showing an example of the cord layers' arrangement in the tread portion of a motorcycle radial tire according to the present invention.
Figure 2:
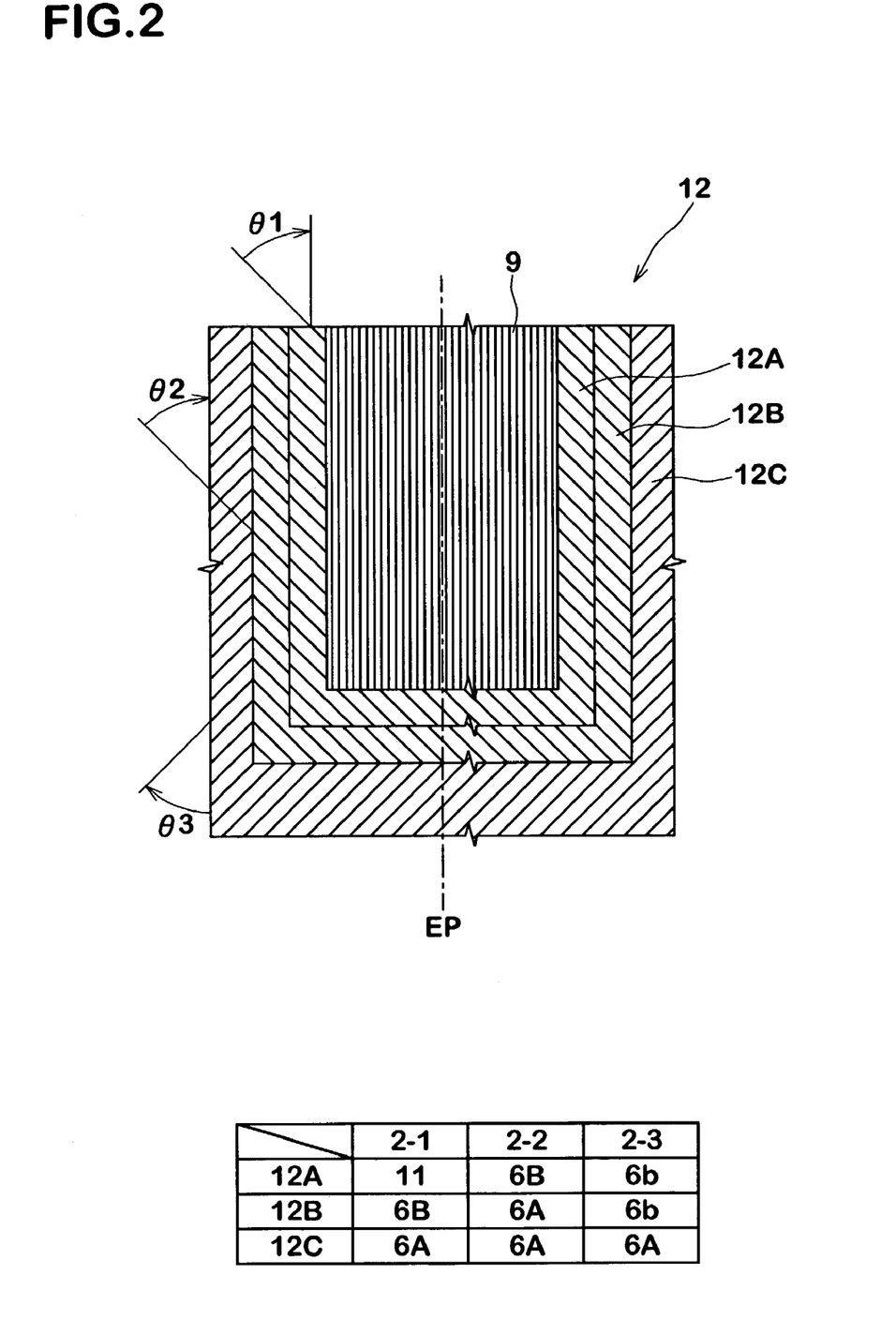
FIG. 2 is a developed view showing another example of the cord layers' arrangement.
Figure 3:
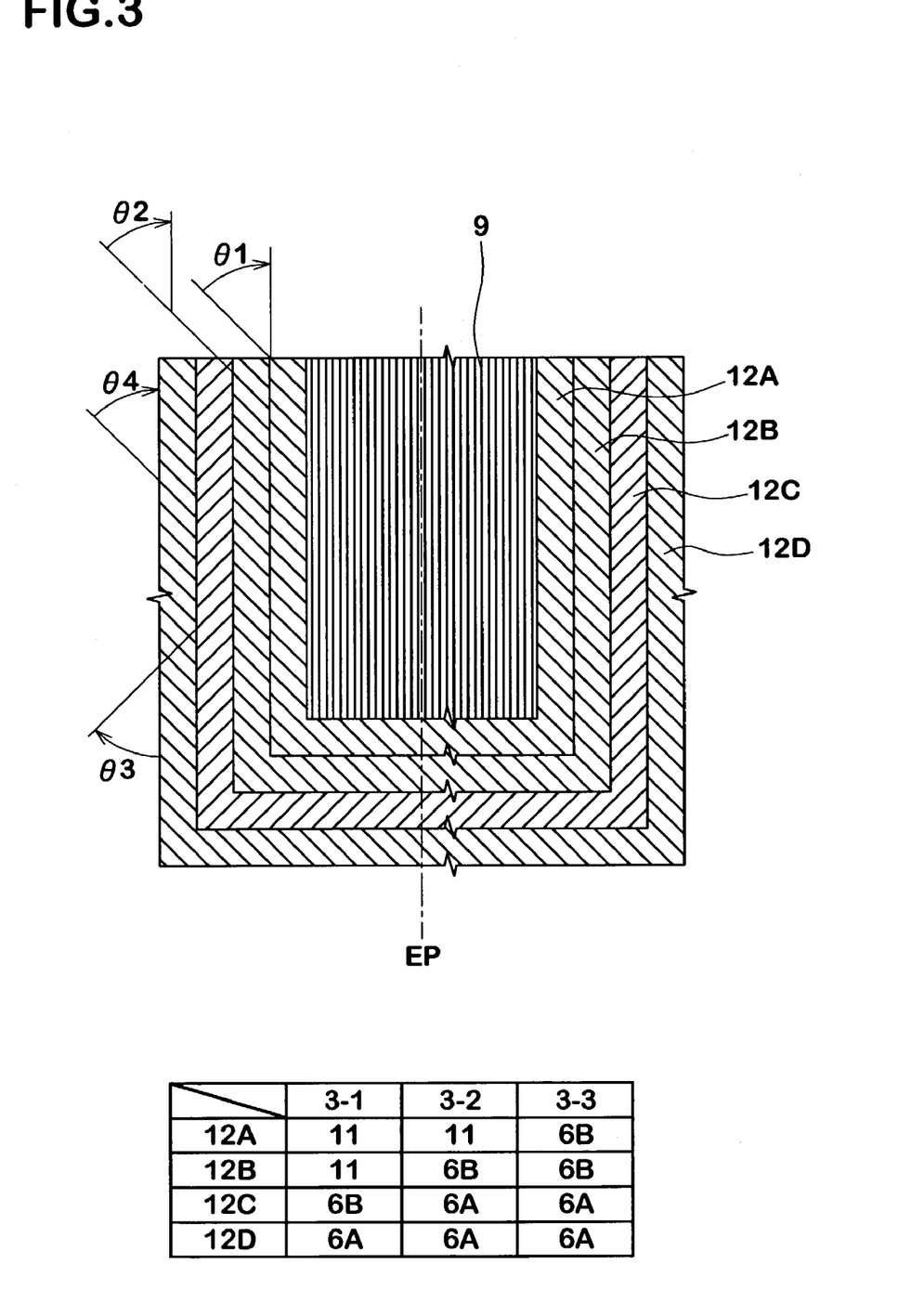
FIG. 3 is a developed view showing still another example of the cord layers' arrangement.

Specifically, three or four cord layers 12 are formed by at least one carcass ply 6A, 6B and optionally at least one breaker ply 11 as shown in FIGS. 1, 2 and 3. (These figures are only for the purpose of showing the relative positions and cord inclinations of the layers 12. The layers' widths and cord angles are not necessarily accurate.)

AS to the radially outermost first layer 12A and the radially inner second layer 12B next to the first layer 12A, the cords in those layers 12A and 12B are inclined to the same direction with respect to the tire equator EP at inclination angles θ1 and θ2, respectively. However, the cords in the third layer 12C next to the second layer 12C are inclined to the opposite direction to the first and second layers 12A and 12B with respect to the tire equator EP at an inclination angle θ3. In case a fourth layer 12D is dispose inside the third layer 12c, the inclination angle θ3 of the third layer 12C is less than 90 degrees in the sense of absolute value, and the cords in the fourth layer 12D are inclined to the opposite direction to the third layer 12C with respect to the tire equator at an inclination angle θ4 less than 90 degrees.

In order to control the rising of the cornering force, the angles θ1, θ2, θ3 and θ4 are set in a range of not less than 65 degrees. Preferably, the angles θ1 and θ2 are set in a range of 72 to 80 degrees in the light of balance between the handlebar shimmy, disturbance absorbability and cornering performance.

(1) Three Layer Example 1

FIG. 1 shows an example where three layers 12A, 12B and 12C exist. In this example, the first layer 12A and second layer 12B are two breaker plies 11, and the third layer 12C is the main portion 6a of a turned-up ply 6A. The cords of the third layer 12c, namely, the carcass cords are arranged radially at 90 degrees with respect to the tire equator EP. (θ3=90 deg.) The cords of the first layer 12A (outer breaker cords) and the cords of the second layer 12B (inner breaker cords) are laid in the same direction or at the same inclination angle between 65 degrees and 85 degrees. (65 deg.=θ1=θ2=<85 deg.)

(2) Three Layer Example 2

FIG. 2 shows another example where three layers 12A, 12B and 12C exist like in the FIG. 1 example, but the cords of the radially innermost third layer 12c in this example are not at 90 degrees. (θ3<90 deg.) In this type of cord arrangement, there are three possible designs.

Design (2-1): combination of the single-ply breaker 7 and the two-ply carcass 6 shown in FIG. 5. That is, the outermost first layer 12A is a breaker ply 11. The second layer 12B is a carcass ply 6B with no turnup. The third layer 12c is the main portion 6a of a carcass ply 6A with turnup portions 6b. The cord inclinations of the second layer 12B and third layer 12c are directionally opposite as explained above, but usually and preferably, they are the numerically same.

Figure 7:
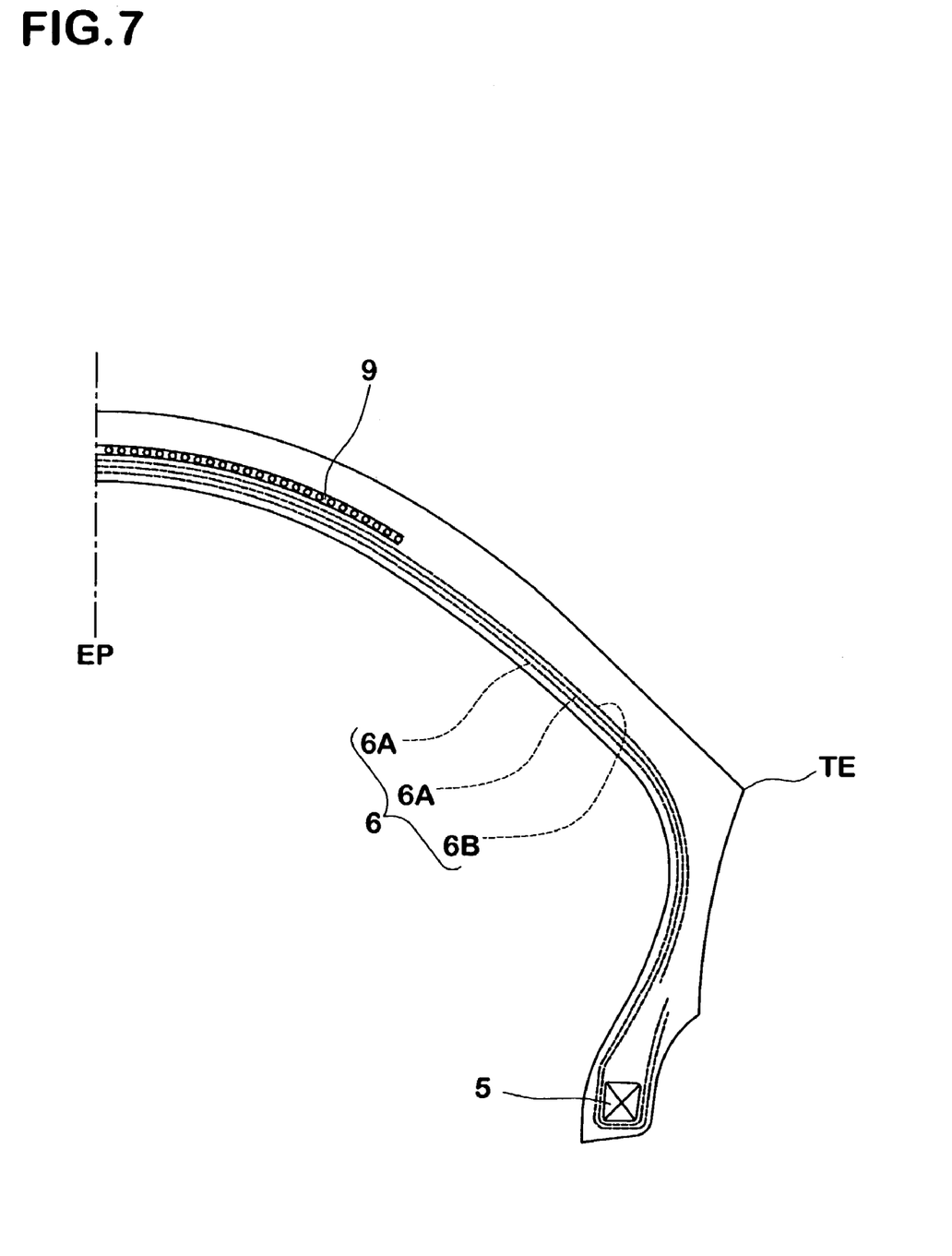
FIG. 7 is a cross sectional view of a motorcycle radial tire according to the present invention wherein the carcass shown in FIG. 6 is used without a breaker.

Design (2—2): Three-ply carcass 6 shown in FIG. 6 and FIG. 7. That is, the outermost first layer 12A is a carcass ply 6B with no turnup. Each of the second layer 12B and third layer 12c are the main portion 6a of a carcass ply 6A with turnup portions 6b.

Figure 8:
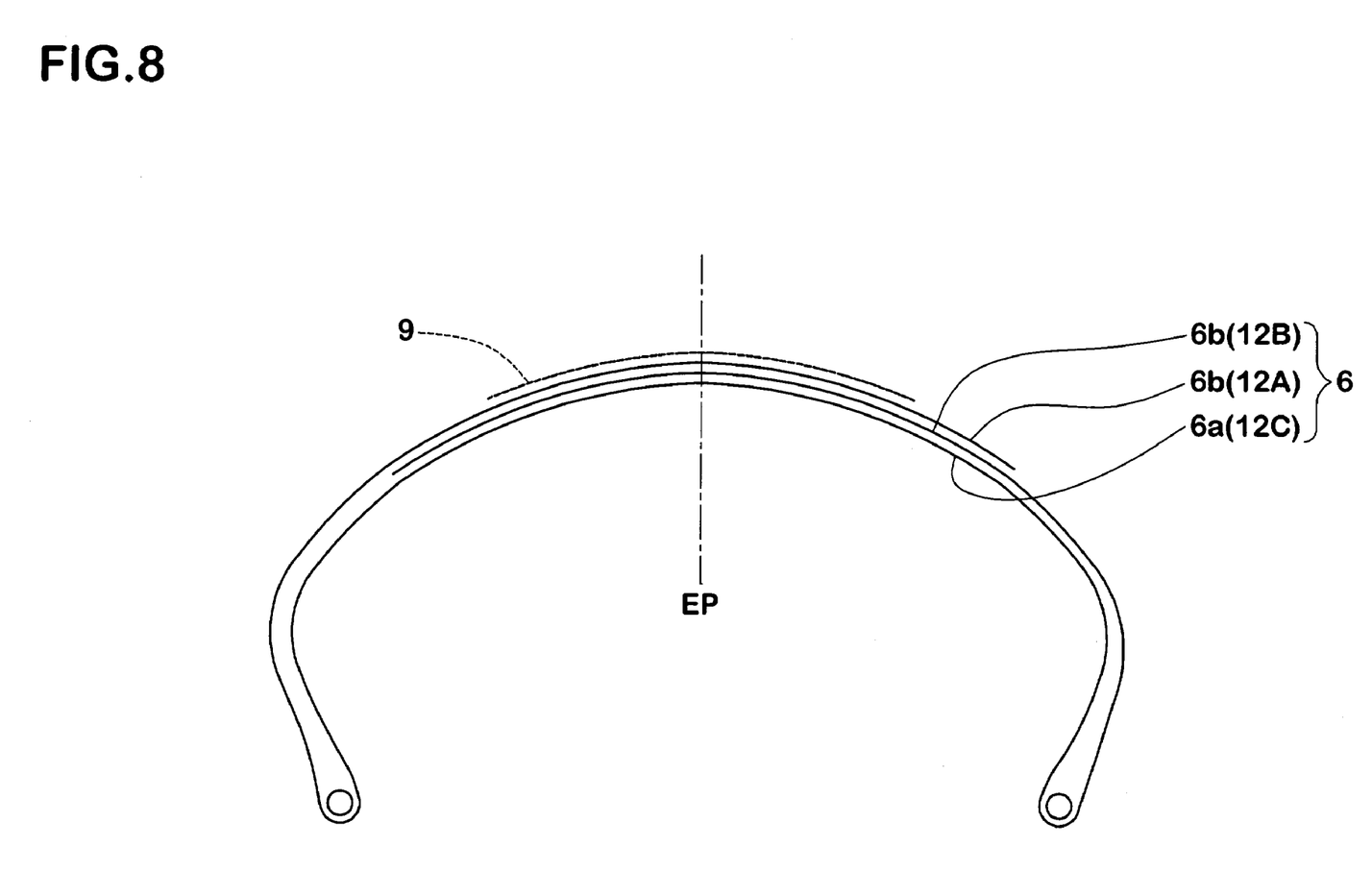
FIG. 8 is a schematic cross sectional view showing another example of the carcass structure which can be used alone without a breaker.

Design (2-3): single-ply carcass 6 shown in FIG. 8. This carcass 6 is composed of a single turned-up ply similar to the above-mentioned turned-up ply 6A. The difference is that the turnup portions 6b are extended into the tread portion 2 to overlap each other so that the overlap width becomes more than the band width Bw but less than the tread width TW.

(3) Four Layer Example 2

FIG. 3 shows still another example where four layers 12A, 12B, 12c and 12D exist. In this type of cord arrangement too, there are three possible designs.

Design (3-1): Combination of the two-ply breaker 7 and the two-ply carcass 6 shown in FIG. 5. That is, each of the first layer 12A and second layer 12B is a breaker ply 11. The third layer 12C is a carcass ply 6B with no turnup. The radially innermost forth layer 12D is the main portion 6a of a carcass ply 6A with turnup portions 6b. The cord inclinations of the third layer 12C and forth layer 12D (carcass ply 6B and carcass ply 6A's main portion 6a) are directionally opposite to each other with respect to the tire equator EP and can be the numerically same.

Design (3-2): Combination of the single-ply breaker 7 and the three-ply carcass 6 shown in FIG. 6. That is, the outermost first layer 12A is a breaker ply 11. The second layer 12B is a carcass ply 6B with no turnup. Each of the third layer 12C and fourth layer 12D is the main portion 6a of a carcass ply 6A with turnup portions 6b.

Design (3—3): Four-ply carcass (not shown). This four-ply carcass is a modification of the carcass 6 shown in FIG. 6, wherein a carcass ply 6B with no turnup is added outside the carcass ply 6B. Thus, the first layer 12A and second layer 12B are the two carcass plies 6B with no turnup. Each of the third layer 12C and fourth layer 12D is the main portion 6a of a carcass ply 6A with turnup portions 6b. The cord inclinations of the third layer 12C and forth layer 12D are directionally opposite to each other with respect to the tire equator EP.

Comparison Tests

Test tires of size 120/70R17 for front wheel having the profile as shown in FIG. 1 and specifications shown in Table 1 were made and tested for handlebar shimmy, disturbance absorbability, cornering performance, camber thrust, and cornering power.

(1) Shimmy, Absorbability and Cornering Test

In the test, a motorcycle (750 cc four-cycle engine) provided on the front wheel (rim size 17XMT3.50) with a test tire (pressure 250 kPa) was run on a dry paved road, and handlebar shimmy, disturbance absorbability and cornering performance were evaluated into ten ranks by the test rider wherein the larger the rank number, the better the performance, and the passing point is six.

(2) Camber Thrust and Cornering Power Test

Using an indoor cornering tester, the camber thrust and cornering power were measured under a vertical load of 1.3 kN and a camber angle of 10 degrees. The results are indicated in Table 1 by an index based on Ref.1 being 100, wherein the larger the index number, the higher the camber thrust and cornering power values.

TABLE 1

| Tire | Ref. 1 | Ref. 2 | Ex. 1 | Ex. 2 | Ex. 3 | Ex. 4 | Ex. 5 | Ex. 6 | Ex. 7 | Ref. 3 |
|---|---|---|---|---|---|---|---|---|---|---|
| Number of Cord layers 12 | 1 | 3 | 3 | 3 | 3 | 3 | 3 | 3 | 3 | 3 |
| Band cord angle (deg.) | 0 | 0 | 0 | 0 | 0 | 0 | 0 | 0 | 0 | 0 |
| angle $\theta_1$ (deg.) | 90 | −72 | +72 | +72 | +72 | +65 | +85 | +80 | +72 | 90 |
| angle $\theta_2$ (deg.) | — | +72 | +72 | +72 | +65 | +65 | +85 | +80 | +72 | 90 |
| angle $\theta_3$ (deg.) | — | 90 | 90 | −72 | −65 | 90 | 90 | 90 | −72 | 90 |
| Number of ply |  |  |  |  |  |  |  |  |  |  |
| Breaker ply 11 | 0 | 2 | 2 | 1 | 1 | 2 | 2 | 2 | 2 | 2 |
| Carcass ply 6B | 0 | 0 | 0 | 1 | 1 | 0 | 0 | 0 | 0 | 0 |
| Carcass ply 6A | 1 | 1 | 1 | 1 | 1 | 1 | 1 | 1 | 1 | 1 |
| Test results |  |  |  |  |  |  |  |  |  |  |
| Shimmy | 7.0 | 5.5 | 7.0 | 6.5 | 6.0 | 6.0 | 7.0 | 7.0 | 6.5 | 7.0 |
| Absorbability | 7.0 | 5.5 | 7.0 | 7.0 | 6.5 | 6.0 | 7.0 | 7.0 | 7.0 | 7.0 |
| Cornering | 5.0 | 7.0 | 6.5 | 7.0 | 7.0 | 6.5 | 6.0 | 6.5 | 7.0 | 5.5 |
| Camber thrust | 100 | 111 | 110 | 115 | 109 | 108 | 112 | 109 | 112 | 107 |
| Cornering power | 100 | 115 | 103 | 104 | 105 | 106 | 102 | 102 | 105 | 99 |

From the test results, it was confirmed that the camber thrust can be increased while controlling the rising of cornering power, and as a result, the cornering performance can be improved while displaying good disturbance absorbability to improve the high speed stability and shimmy.

The invention claimed is:

1. A radial motorcycle tire comprising
a tread portion with a pair of tread edges,
a pair of sidewall portions,
a pair of bead portions each with a bead core therein,
a band disposed in the tread portion and composed of windings of at least one cord wound at an angle or not more than 5 degrees with respect to the tire equator,
said tread portion provided radially inside the band with
at least two layers of cords comprising
a radially outermost first layer, and
a radially inner second layer next to the first layer, wherein
the first layer and second layer are a pair of turn-up portions of a carcass ply which is turned up around the bead core in each of the bead portions and extended into the tread portion, and with respect to the tire equator,
the cords of the outermost first layer are inclined in a direction at an angle of from 65 to 80 degrees, and
the cords of the second layer are inclined to the same direction as the first layer at an angle of from 65 to 80 degrees, wherein
said band has an axial width in the range of 0.4 to 0.7 times the tread width measured axially between the tread edges, and
said turnup portions extending into the tread portion overlap each other so that the overlap width becomes more than the width of the band but less than the tread width.

* * * * *